United States Patent
An et al.

(10) Patent No.: US 12,469,672 B2
(45) Date of Patent: Nov. 11, 2025

(54) VESSEL HOLDER FIXED WITH CONICAL SCREW

(71) Applicant: CURIOSIS CO., LTD, Seoul (KR)

(72) Inventors: Sung Eun An, Incheon (KR); Bong Woo Kim, Seoul (KR)

(73) Assignee: CURIOSIS CO., LTD, Seoul (KR)

( * ) Notice: Subject to any disclaimer, the term of this patent is extended or adjusted under 35 U.S.C. 154(b) by 0 days.

(21) Appl. No.: 18/016,060

(22) PCT Filed: Feb. 25, 2022

(86) PCT No.: PCT/KR2022/002817
§ 371 (c)(1),
(2) Date: Jan. 13, 2023

(87) PCT Pub. No.: WO2023/158000
PCT Pub. Date: Aug. 24, 2023

(65) Prior Publication Data
US 2024/0304408 A1    Sep. 12, 2024

(30) Foreign Application Priority Data
Feb. 16, 2022  (KR) .................. 10-2022-0020050

(51) Int. Cl.
*H01J 37/20*   (2006.01)
*G02B 21/26*   (2006.01)

(52) U.S. Cl.
CPC .............. *H01J 37/20* (2013.01); *G02B 21/26* (2013.01)

(58) Field of Classification Search
CPC ................................. H01J 37/20; G02B 21/26
See application file for complete search history.

(56) References Cited

U.S. PATENT DOCUMENTS

| | | | |
|---|---|---|---|
| 9,024,275 B2* | 5/2015 | Terada | H01J 37/26 250/440.11 |
| 9,301,875 B2* | 4/2016 | Tu | A61F 9/00781 |
| 9,522,823 B2* | 12/2016 | Feng | B26F 1/02 |
| 12,196,941 B2* | 1/2025 | Stegmann | H01J 37/20 |
| 2010/0007946 A1* | 1/2010 | Takeuchi | G02B 21/26 359/385 |
| 2020/0161080 A1* | 5/2020 | Chun | H01J 37/32724 |

FOREIGN PATENT DOCUMENTS

| | | |
|---|---|---|
| JP | H06-126698 A | 5/1994 |
| JP | H9-5636 A | 1/1997 |
| JP | 2013-213855 A | 10/2013 |

(Continued)

OTHER PUBLICATIONS

Vessel Holder—Related Products, 2015, NanoEnTek Inc. (3 pages).

*Primary Examiner* — David A Vanore
(74) *Attorney, Agent, or Firm* — Dinsmore & Shohl LLP; Yongsok Choi, Esq.

(57) ABSTRACT

The present invention relates to a vessel holder fixed with a conical screw for use in a biological microscope or the like, and more particularly, to an improved vessel holder fixed with a conical screw to be accurately fixed to a reference side without a change in position with respect to impact vibration while allowing the vessel holders to be closely attached to an upper surface of the stage with only one screw, thereby improving usability, cell observation efficiency and accuracy.

5 Claims, 5 Drawing Sheets

(56) References Cited

FOREIGN PATENT DOCUMENTS

| | | |
|---|---|---|
| JP | 2021-107826 A | 7/2021 |
| KR | 10-2008-0046732 A | 5/2008 |
| KR | 10-1234604 B1 | 2/2013 |
| KR | 10-2014-0130279 A | 11/2014 |
| KR | 10-2018-0036537 A | 4/2018 |

* cited by examiner

A-A line cross-sectional view

VESSEL HOLDER FIXED WITH CONICAL SCREW

CROSS-REFERENCE TO RELATED APPLICATION

The present application is a national stage filing under 35 U.S.C § 371 of PCT application number PCT/KR2022/002817 filed on Feb. 25, 2022, which is based upon and claims the benefit of priority to Korean Patent Application No. 10-2022-0020050, filed on Feb. 16, 2022, in the Korean Intellectual Property Office. All of the aforementioned applications are incorporated herein by reference in their entireties.

TECHNICAL FIELD

The present invention relates to a vessel holder fixed with a conical screw for use in a biological microscope or the like, and more particularly, to an improved vessel holder fixed with the conical screw to be accurately fixed to a reference side without a change in position with respect to impact vibration while allowing the vessel holders to be closely attached to an upper surface of a stage with only one screw, thereby improving usability, cell observation efficiency and accuracy.

BACKGROUND

In general, a biological microscope is a microscope for use in observing a transparent sample such as an organism. That is, the biological microscope is a microscope for observing contrast formed in an image due to absorption difference of each part of the sample when light is transmitted under or above a vessel holder.

Figure 1:
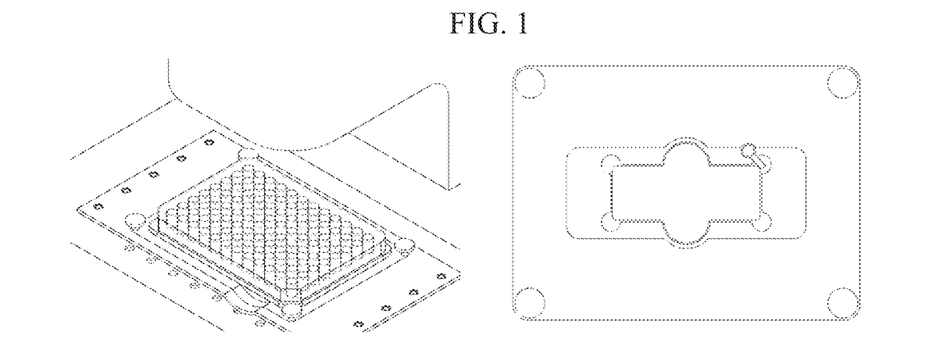
FIGS. 1 and 2 are the exemplary sample photographs illustrating a structure of a conventional vessel holder.

Here, the vessel holder is an adapter for fixing various types of plastic wares for cell observation to the observation stage. The vessel holder is generally fixed in such a way as to fasten screws to the four corners or diagonal corners to close the upper surface of the stage, as shown in the example of FIG. 1.

This structure has an advantage in that the upper surface of the stage and the bottom surface of the vessel holder are completely in close contact with each other. However, the structure is troublesome and disadvantageous since the screw must be fastened four times at each corner, and in particular, when a protruding screw head is raised to the space above the vessel holder, a utilization space is reduced by interference with the screw head. In addition, in case that the above structure is applied to equipment in which a reference side should be used, the user has to push and mount the vessel holder onto the reference side.

Figure 2:
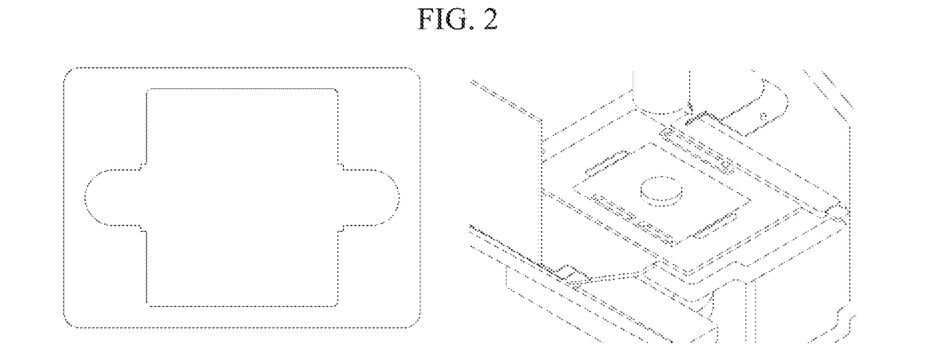

In order to improve the above disadvantages, as illustrated in FIG. 2, a method of placing the vessel holder onto a hole matching an outer size of the vessel holder, thereby screwing is unnecessary, is disclosed. This structure, however, is vulnerable to external vibrations and impacts, so that the vessel holder can deviate from the initially installed position and relocating the observation position is necessary. Due to the high observation magnification, relocating the observation position is very difficult and laborious. In addition, the lifting issue also occurs because the upper surface of the stage and the bottom surface of the vessel holder are not completely in close contact.

As another example, although not shown in the drawings, there is another way of fixing by a clip or by a spring on the side. However, in the case of fixing by a clip, since the clip as a fixing tool protrudes above the vessel holder, the same problem as in the above-described case of screw head protrusion occurs. Further, in a case of securing by a spring, the problem of protruding above the vessel holder may be resolved, but the lifting issue that the upper surface of a stage and the bottom surface of the vessel holders are not completely in close contact is still unresolved.

(Patent Document 1) Korean Patent No. 10-1234604 (2013.02.13), A cryo stage for electron probe micro analysis and observation of biological samples (Patent Document 2) Korean Laid-Open Patent Publication No. 10-2014-0130279 (2014.11.10), Cell and solution condition screening system (Patent Document 3) Korean Laid-Open Patent Publication No. 10-2018-0036537 (2018.04.09) A wireless real object image device having a microscopic function

SUMMARY

Aspects of the present invention are to address at least the above-mentioned problems and/or disadvantages and to provide at least the advantages described below. Accordingly, the main objective of the present invention is to provide an improved vessel holder fixed with a conical screw so that the vessel holder can be accurately fixed to a reference side without a change in position with respect to impact vibration, while being brought into close contact with an upper surface of a stage with only one screw, thereby improving convenience in use, cell observation efficiency and accuracy.

In order to achieve the above objective, the present invention provides a vessel holder fixed with a conical screw, which is used for a stage assembly including a stage having a holder groove and a vessel holder seated on the holder groove, characterized in that one side of the holder groove is a reference side, a wedge insertion groove is formed in the reference side, and a screw opening is formed on the holder groove opposite to the reference side; wherein one end of the vessel holder is formed with a protruding wedge inserted into the wedge insertion groove, and a screw hole is formed on the vessel holder opposite to the protruding wedge; and wherein a fixing screw is fastened to the screw hole and the screw opening.

One embodiment of the present invention is also characterized in that the screw hole has a cone shape, and the lower part of a screw head of the fixing screw is formed in a conical shape. Therefore, even if the protruding wedge 240 is completely inserted into the wedge insertion groove 130, a disparity distance D does not become '0', so the assembly is completed at an intermediate point where it is not completely united.

One embodiment of the present invention is also characterized in that the wedge insertion groove has a '<' shape, and the protruding wedge has a shape corresponding to the shape of the wedge insertion groove.

One embodiment of the present invention is also characterized in that both ends of the protruding wedge are diagonally cut to form inclined surfaces, and a tip width of the protruding wedge is smaller than a width of the wedge insertion groove.

One embodiment of the present invention is also characterized in that a presser is further provided at a distance from the screw hole of the vessel holder, and the presser is configured to be axially fixed to the upper surface of the vessels holder so as to be pivotable within a certain angle range.

According to the present invention, the following effects can be obtained.

First, only one screw allows the vessel holder to adhere to the upper surface of the stage and to be accurately fixed to the reference side without a change in position with respect to impact vibration.

Second, it is possible to save cost by reducing the number of four screws to one, and also to secure three projected screw seat spaces so as to apply relatively various plastic wares thereto.

Third, the present invention is widely applicable to the field of product fastening which requires frequent screwings.

Fourth, as a vessel holder, the present invention can be applied as it is to various application holders used in observation or test stages as well as cell imaging equipment.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Hereinafter, the disclosure will be described in detail by explaining preferred embodiments of the present invention with reference to the accompanying drawings.

Before addressing the detailed description, it should be noted that the following specific structural or functional descriptions are merely illustrated for the purpose of describing an embodiment according to the present inventive concept, and the disclosure can be embodied in many different forms and should not be construed as being limited to the embodiments of the disclosure set forth herein. Particular implementations described herein merely correspond to embodiments of the disclosure and do not limit the scope of the disclosure in any way.

In addition, since embodiments according to the present inventive concepts may have various modifications and various forms, specific embodiments are illustrated in the drawings and described in detail herein. It should be understood, however, that they do not intend to limit embodiments according to the inventive concept to the particular disclosed forms, but to cover all modifications, equivalents, and alternatives falling within the spirit and scope of the invention.

According to the present invention, the vessel holder fixed by a conical screw has a form in which only one fixing screw is used to firmly fix the vessel holder to the upper surface of the stage so that it can be automatically brought into close contact with the reference side of the stage.

In this case, the one fixing screw to be used has a conical shape below the screw head, and this shape serves the following two functions.

The first function is the inherent role of the screw to bring the peripheral portion of the fixing screw of the vessel holder into close contact with the upper surface of the stage.

The second function is that the conical shape under the screw head pushes the vessel holder against the reference side to bring it into intimate contact.

For these functions, the screw hole of the vessel holder is not centered with the screw opening of the stage in which the fixing screw is assembled on the stage, but is formed farther than the position of the screw opening in the direction to push the vessel holder to a reference side.

As a result, when the fixing screw is passed through the screw hole of the vessel holder and is fastened to the screw opening of the stage, the screw hole of the vessel holder does not coincide with the center of the screw opening of the stage, so that the conical shape below a screw head and the conical shape of the screw hole of the vessel holder come into line contact with each other in the direction of the reference side.

Herein, as the fastening force of the fixing screw grows larger, the incline in which the fixing screw and the screw hole come in contact with each other pushes the vessel holder to the reference side more strongly.

In addition, a protruding wedge is formed on one side of the vessel holder in which the vessel holder and the reference side come in contact with each other to fix the vessel holder, and a wedge insertion groove is formed in the lower portion of the reference side as a '<' shape so that the protruding wedge can be inserted.

Therefore, when a pressure is applied in the direction of the reference side of the stage in a state in which the protruding wedge is disposed to be inserted into the wedge insertion groove having the '<' shape, the vessel holder is moved, and the protruding wedge is inserted into the wedge insertion groove having the '<' shape, and then the protruding wedge is locked. As such, the vessel holder is tightly fixed to the upper surface of the stage.

Accordingly, the surroundings of the screw can be directly attached using one screw with a conical shape below the screw head. In addition, at a distance from the screw, the vessel holder is completely and closely fixed to the upper surface of the stage based on the combination of the reference side with the wedge-insertion groove and the protruding wedge having the '<' shape.

According to this process, the essential function of the vessel holder being closely attached to the upper surface of the stage and being closely attached to the reference side is implemented with one crew so that the position does not change by the impact vibration. In addition, the inconvenience required for assembly can be reduced by reducing four screws to one, and the additional side fixing tool is not required. Thus, the cost can be saved and the simplification of the shape can ensure aesthetic and benefit that relatively various plastic wares can be applied can be obtained by securing three screw protruding spaces.

Furthermore, the present invention may be configured to make the vessel holder to adhere two reference surfaces (the upper surface of the stage, and the reference side surface) by using the inclined surface twice, and may also be configured to allow the vessel holder to adhere to three reference surfaces so as to be fixed in a completely fixed position.

In particular, according to the present invention, it is possible to adjust the degree of contact by changing the angle of the inclined surface. It is also possible to maintain the fixation force because sliding contact and sliding action along the inclined surface occur even when the inclination angles of the two parts to be contacted do not exactly match. Accordingly, the present invention can be widely applicable to a structure in which the parts should be pushed into deep and narrow gaps and only the parts exposed to the outside may be filled with screws, or to a field in which the user's inconvenience due to frequent screwing should be reduced. In particular, when it comes to holders, the present invention can be appliable to various application holders used for a stage for observation and tests, in addition to holders used for cell imaging equipment.

Figure 3:
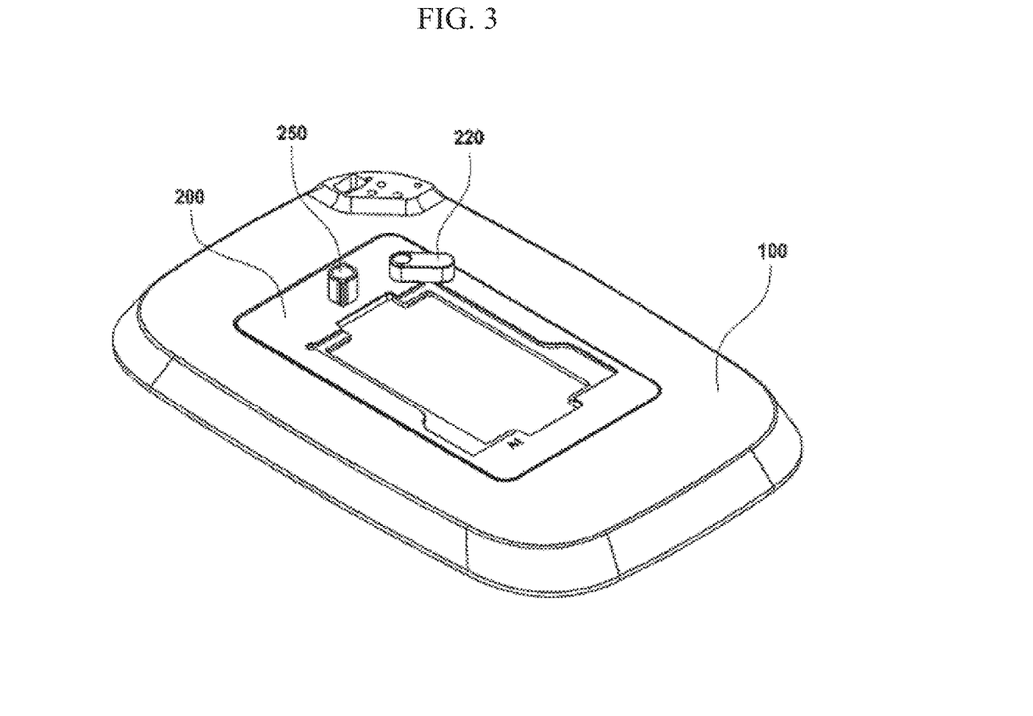
FIG. 3 is an exemplary perspective view of an assembly according to the present invention.
Figure 4:
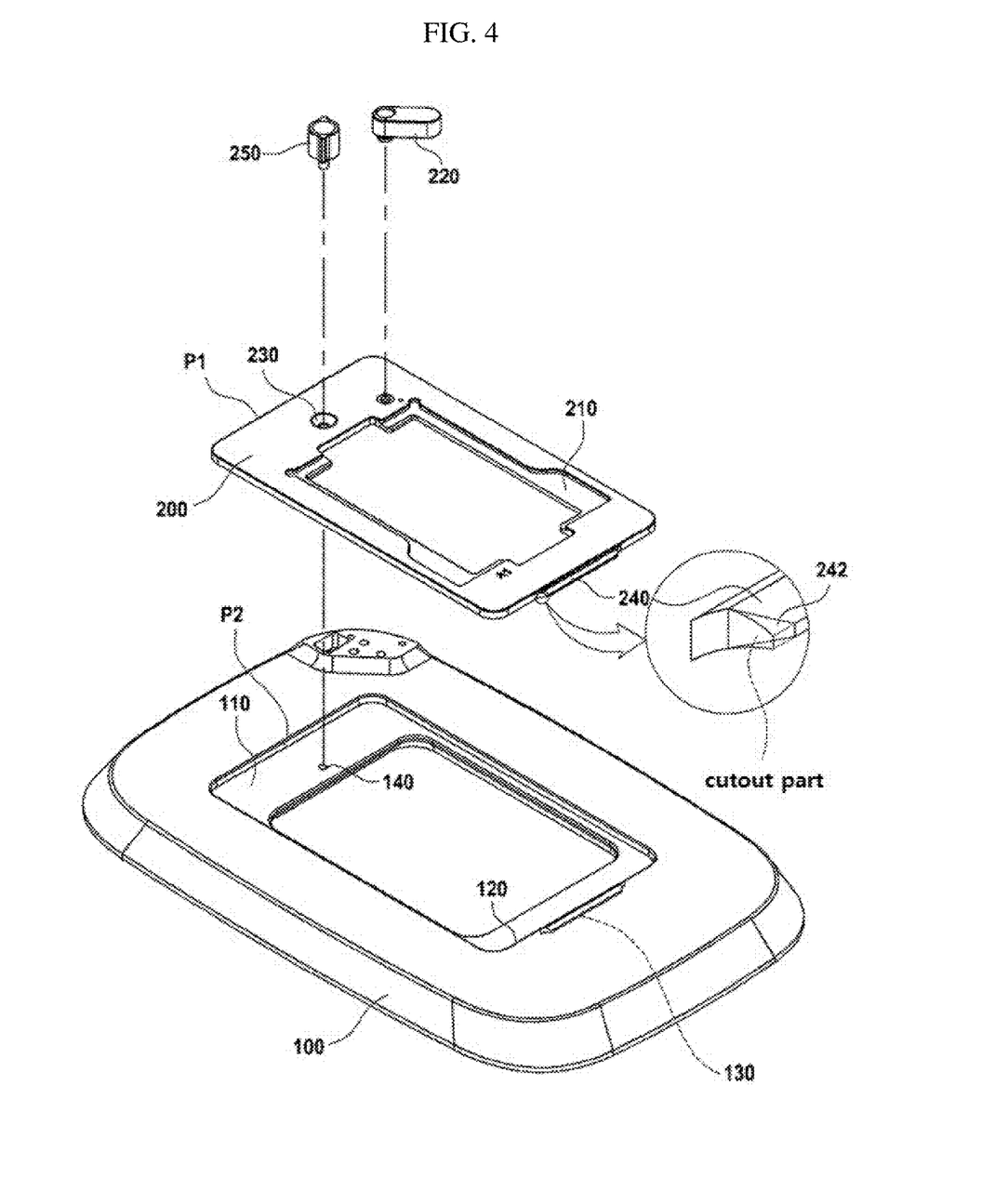
FIG. 4 is an exploded view of the example of FIG. 3.
Figure 5:
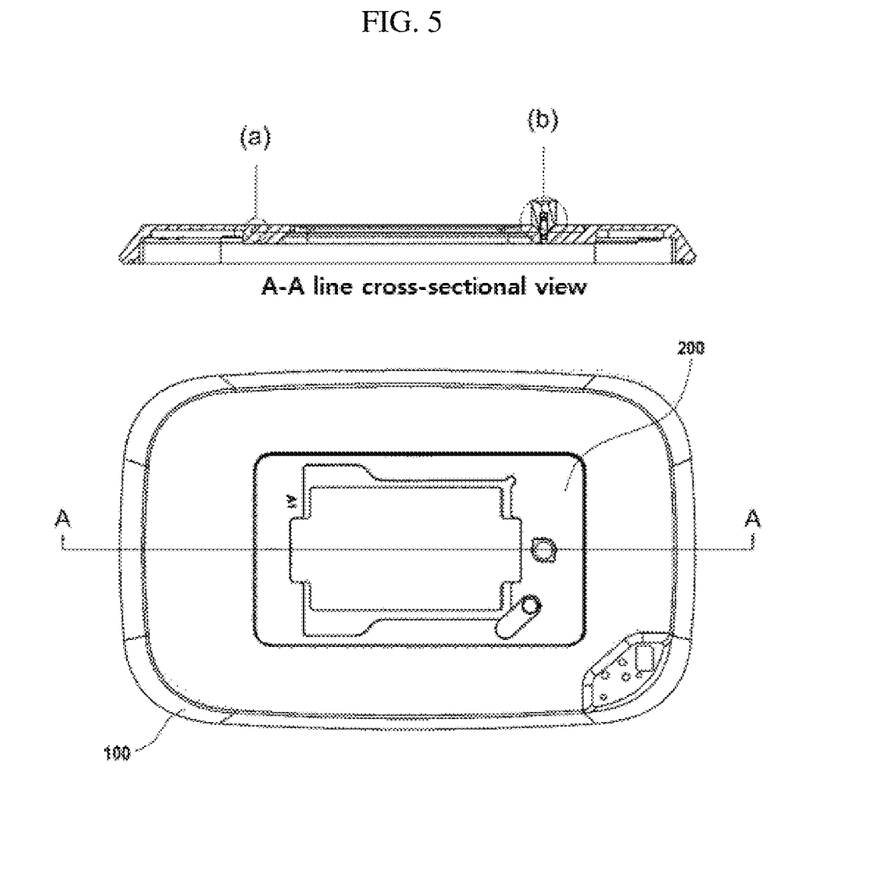
FIG. 5 is an exemplary plan view and a cross-sectional view taken along line A-A of FIG. 3.

More specifically, a vessel holder fixed with a conical screw according to the present invention includes a stage 100 and a vessel holder 200 coupled to the stage 100, as illustrated in FIGS. 3-5.

Herein, a holder groove 110 is formed in the stage 100 so that the vessel holder 200 can be mounted thereon.

In particular, one side of the holder groove 110 can be the reference side 120.

Herein, the reference side 120 is a side that becomes a reference point to which the vessel holder 200 is fixed.

Figure 6A:
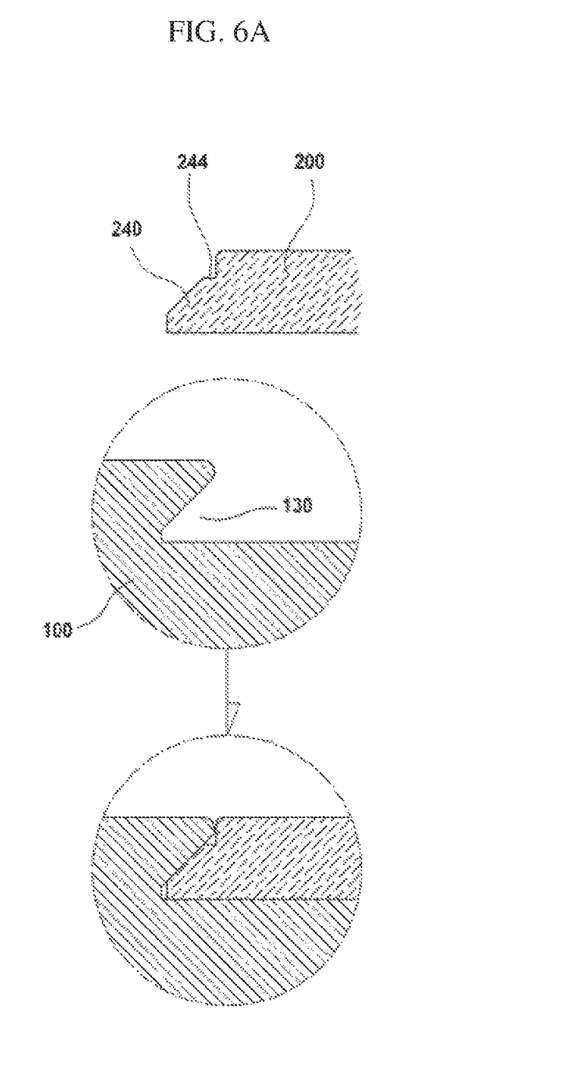
FIGS. 6A and 6B are exemplary enlarged illustrations of the main part of FIG. 5.

Further, the reference side 120 is formed with a wedge insertion groove 130 having a '<' shape recessed inward. That is, the wedge insertion groove 130 is formed recessed inward on the face of the reference side 120, which is easily understandable with reference to the enlarged illustration in FIG. 6A.

In addition, the vessel holder 200 is a means for bringing plastic wares of various forms for cell observation into close contact with the upper surface of the stage 100.

For this, the vessel holder 200 is provided with a ware seat 210.

In this case, the ware seat 210 may have various shapes depending on the shape of the plastic ware.

In addition, one side of upper surface of the vessel holder 200 is provided with a presser 220 for fixing the plastic ware placed on the ware seat 210 so as for the plastic ware not to move.

The presser 220 is configured to be axially fixed to the upper surface of the vessel holder 200 so as to be able to pivot within a certain angle range, and is rotationally moved so that when the plastic ware is seated on the ware seat 210, it is caught and presses its side surface.

In addition, a screw hole 230 is formed at a distance from the presser 220, and a protruding wedge 240 to be inserted into the wedge insertion groove 130 may be formed in an end surface of the end opposite to the end on which the screw hole 230 is formed.

Figure 6B:
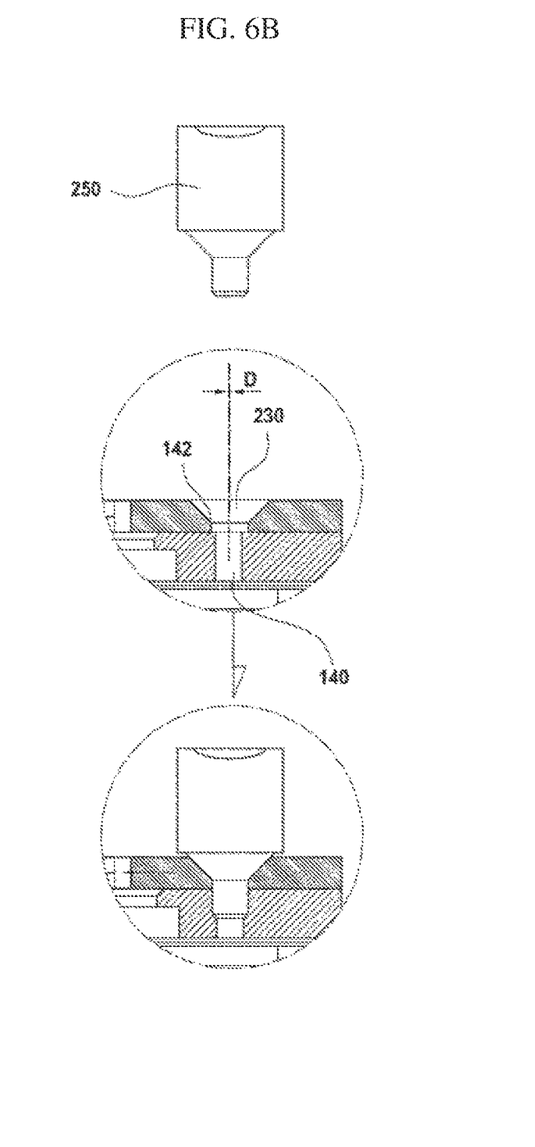

In addition, the screw hole 230 is formed in a cone shape as in FIGS. 4 and 6B.

Then, in a state where the inclined surface of the protruding wedge 240 of the vessel holder 200 and the inclined surface of the wedge insertion groove 130 are aligned with each other, the screw opening 140 is formed at a position spaced apart by a distance (D) from the position of the holder groove 110 immediately below the screw hole 230. That is, as shown in FIG. 6B, central vertical lines of the screw holes 230 and the screw opening 140 are deviated from each other.

In addition, a fixing screw 250 is fastened to the screw hole 230, and the lower surface of the screw head of the fixing screw is formed in a conical shape.

That is, when the fixing screw 250 whose lower surface of the screw head is formed in a conical shape is fastened to the screw hole 230 having the cone shape, the cone shape and the conical shape are fastened in line contact since the center vertical lines are deviated from each other.

This generates the effect that the vessel holder is pushed out to the line contact direction, because a lateral load is generated toward the screw center while the inclined surfaces are in line contact with each other.

In addition, since the diameter of the screw opening 140 is larger than the diameters of the lower end of the fixing screw 250 and the screw hole 230, the screw can be screw-fixed regardless of the difference in level (the fixing screw 250 can be assembled without interference between the fixing screw at the lower end of the tapered surface 142 and the screw opening 140 because a complete shape of the screw hole 230 can also be viewed through a hole of the fixing screw 250), and the screws can be positioned more easily through the tapered surface 142 to facilitate assembly.

In this way, when the fixing screw 250 digs into the screw opening 140, the protruding wedge 240 is tightly inserted and fixed into the wedge insertion groove 130 due to the disparity distance D.

In addition, a sliding coating layer may be further formed on a surface of the holder groove 110 to improve slidability of the vessel holder 200.

The sliding coating layer is formed by applying a coating solution obtained by adding and mixing 15 parts by weight of sodium borohydride, 5 parts by weight of rutin, 2.5 parts by weight of boron nitride, and 5 part by weight of dammar gum to 100 parts by weight of a polycarbonate resin, which is excellent in durability and transparency.

Herein, sodium borohydride reduces the friction and increases the slip property of the vessel holder 200, Rutin suppresses the interfacial separation of the coating layer, and boron nitride is added to maintain the heat dissipation properties of the coating layer and to enhance the heat resistance.

In addition, dammar gum is a resin obtained from pine wood, which suppresses linear expansion, imparts lubricity, and improves slidability on the coating surface.

The invention having such a configuration has the following operational relationship.

First, the end of the vessel holder 200 with the protruding wedge 240 is placed towards the reference side 120 of the stage 100.

Then, the protruding wedge 240 is made to coincide with the wedge insertion groove 130, and then the protruding wedge 240 is rotated in the opposite direction while the protruding wedge 240 is a hinge reference point, and then is placed in the holder groove 110.

Then, as shown in FIG. 5, as the protruding wedge 240 enters the wedge insertion groove 130, the vessel holder 200 is correctly engaged with the holder groove 110 of the stage 100.

In this state, when the fixing screw 250 is inserted into the screw hole 230 and tightened, the lower end screw portion of the fixing screw 250 is screw-fixed into the screw opening 140 provided in the holder groove 110.

As a result, due to the disparity distance D, the vessel holder 200 is allowed to be secured as firmly as possible to the reference side 120 and the upper surface of the stage.

In other words, higher fixing stability can be ensured by the wedge engagement, which occurs when the protruding wedge 240 of the corresponding shape is inserted and united into the wedge insertion groove 130 having a '<' shape.

Further, both ends of the protruding wedge 240 may be diagonally cut to form an inclined surface 242, and when inserted into the wedge insertion groove 130, the tip width of the protruding wedge 240 is smaller than the width of the wedge insertion groove 130 to be guided for being more smoothly performed.

In particular, the fixation force of the fixing screw 250 having a conical shape enables the vessel holder 200 to always maintain the fixed position stably and without flowing even against external impact or vibration while the screw hole 230 having the cone shape is mutually engaged to the fixing screw 250.

In other words, since the hole size of the screw hole 230 is larger than that of the screw opening 140, even if there is a disparity distance D (a size in which the center vertical line is deviated), the screw passes through the screw hole 230 and can be assembled without interference.

That is, the conical shape of the fixing screw 250 does not completely conform to the cone-shape of the screw hole 230, and serves to push the vessel holder 200 in the direction of the reference side 120 while making line contact in the protruding wedge 240 direction.

As a result, even if the protruding wedge 240 is fully inserted into the wedge insertion groove 130, the disparity distance D does not become '0' (because the line contact site must be constantly pushing the vessel holder 200 against the reference side) so that assembly is completed at the midpoint where it is not fully mated and mated.

Accordingly, it is possible to maintain a stable contact structure with only one screw, to increase convenience in use, to improve efficiency due to assembly work, and to improve accuracy in cell observation by fixing stability.

DESCRIPTION OF REFERENCE NUMERALS

100 stage
110 holder groove
120 reference side
130 wedge insertion groove
140 screw opening
200 vessel holder
210 ware fitting portion
220 presser
230 screw hole
240 protruding wedge
250 fixing screw

What is claimed is:

1. A vessel holder fixed with a conical screw, which is used for a stage assembly comprising a stage having a holder groove and a vessel holder seated on the holder groove, characterized in that
   one side surface of the holder groove is a reference side, a wedge insertion groove is formed in the reference side, and a screw opening is formed on the holder groove opposite to the reference side;
   wherein one end of the vessel holder is formed with a protruding wedge inserted into the wedge insertion groove, and a screw hole is formed on the vessel holder opposite to the protruding wedge; and
   wherein a fixing screw is fastened to the screw hole and the screw opening.

2. The vessel holder fixed with a conical screw of claim 1,
   wherein the screw hole has a cone-shape, and a lower part of a screw head of the fixing screw is formed in a conical shape; and
   wherein even if the protruding wedge is fully inserted into the wedge insertion groove, a disparity distance does not become '0,' so the assembly is completed at an intermediate point where it is not completely united.

3. The vessel holder fixed with a conical screw of claim 1,
   wherein the wedge insertion groove is formed recessed inward on the face of the reference side, and the protruding wedge has a shape corresponding to the shape of the wedge insertion groove.

4. The vessel holder fixed with a conical screw of claim 3,
   wherein both ends of the protruding wedge are diagonally cut to form inclined surfaces, and a tip width of the protruding wedge is smaller than a width of a wedge insertion groove.

5. The vessel holder fixed with a conical screw of claim 1, further comprising: a presser at a distance from the screw hole of the vessel holder, wherein the presser is configured to be axially fixed to an upper surface of the vessel holder and to be pivotable within a certain angle range.

* * * * *